United States Patent
Chun et al.

(10) Patent No.: US 9,137,073 B2
(45) Date of Patent: Sep. 15, 2015

(54) METHOD FOR TRANSMITTING SIGNAL ON BANDWIDTH REQUEST CHANNEL AT MOBILE STATION, MOBILE STATION APPARATUS USING THE SAME, METHOD FOR PERFORMING BANDWIDTH REQUEST PROCEDURE AT BASE STATION, AND BASE STATION APPARATUS USING THE SAME

(75) Inventors: Jin Young Chun, Gyeonggi-do (KR); Sung Ho Park, Gyeonggi-do (KR); Bin Chul Ihm, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 1459 days.

(21) Appl. No.: 12/705,037

(22) Filed: Feb. 12, 2010

(65) Prior Publication Data
US 2010/0214985 A1 Aug. 26, 2010

Related U.S. Application Data

(60) Provisional application No. 61/152,233, filed on Feb. 12, 2009, provisional application No. 61/152,942, filed on Feb. 16, 2009.

(30) Foreign Application Priority Data

Feb. 12, 2010 (KR) .................. 10-2010-0013361

(51) Int. Cl.
*H04W 4/00* (2009.01)
*H04L 27/26* (2006.01)
(Continued)

(52) U.S. Cl.
CPC ....... *H04L 27/2602* (2013.01); *H04W 74/0866* (2013.01); *H04W 74/004* (2013.01)

(58) Field of Classification Search
USPC ................................. 370/328, 335
See application file for complete search history.

(56) References Cited

U.S. PATENT DOCUMENTS

2007/0165728 A1 7/2007 Parizhsky et al.
2007/0291719 A1* 12/2007 Demirhan et al. ............ 370/338

FOREIGN PATENT DOCUMENTS

CN 1855745 11/2006
KR 10-0514287 9/2005
(Continued)

OTHER PUBLICATIONS

"IEEE P802.16m/D4, Part 16: Air Interface for Fixed and Mobile Broadband Wireless Access Systems".*
(Continued)

*Primary Examiner* — Gregory Sefcheck
*Assistant Examiner* — Majid Esmaeilian
(74) *Attorney, Agent, or Firm* — Lee, Hong, Degerman, Kang & Waimey

(57) ABSTRACT

A method for transmitting a signal on a bandwidth request channel, a mobile station apparatus using the same, a method for performing a bandwidth request procedure in relation to a bandwidth request from a mobile station, and a base station apparatus using the same are disclosed. A mobile station transmits a bandwidth request preamble and a bandwidth request message together to a base station to request a bandwidth. A region of the bandwidth request message may be configured as null tones. In response to the bandwidth request of the mobile station, the base station transmits a BR ACK A-MAP IE indicating reception of the bandwidth request to the mobile station in response to the bandwidth request. The base station transmits an uplink grant to the mobile station by a BR ACK A-MAP IE or a CDMA allocation A-MAP IE. Upon receipt of the uplink grant from the base station, the mobile station transmits uplink scheduled data to the base station. However, if the base station fails to decode the quick access message or the region of the quick access message is filled with null tones, the base station transmits a grant for a bandwidth request header to the mobile station, instead of an uplink grant.

8 Claims, 9 Drawing Sheets

(51) Int. Cl.
*H04W 74/08* (2009.01)
*H04W 74/00* (2009.01)

(56) References Cited

FOREIGN PATENT DOCUMENTS

| WO | 2005040960 | 5/2005 |
|---|---|---|
| WO | 2007024101 | 3/2007 |
| WO | 2010093204 | 8/2010 |

OTHER PUBLICATIONS

The State Intellectual Property Office of the People's Republic of China Application Serial No. 201080007628.4, Office Action dated Sep. 4, 2013, 6 pages.
Intellectual Property Corporation of Malaysia Application No. PI 2011003572, Office Action dated Apr. 30, 2014, 4 pages.

* cited by examiner

☒ Tone for Preamble (or indicator)

▨ Tone for data (quick access message or BW REQ. message)

☐ Null tone (a)　　　　　(b)　　　　　(c)　　　　　(d)

METHOD FOR TRANSMITTING SIGNAL ON BANDWIDTH REQUEST CHANNEL AT MOBILE STATION, MOBILE STATION APPARATUS USING THE SAME, METHOD FOR PERFORMING BANDWIDTH REQUEST PROCEDURE AT BASE STATION, AND BASE STATION APPARATUS USING THE SAME

CROSS-REFERENCE TO RELATED APPLICATIONS

This application claims the benefit of the priority to U.S. Provisional Application Ser. Nos. 61/152,233 and 61/152,942, filed on Feb. 12, 2009, and 61/152,942, filed on Feb. 16, 2009, and pursuant to 35 U.S.C. §119(a), this application claims the benefit of earlier filing date and right of priority to Korean Application No. 10-2010-0013361, filed on Feb. 12, 2010, the contents of all of which are hereby incorporated by reference herein in their entireties.

FIELD OF THE INVENTION

The present invention relates to methods for performing a Bandwidth Request (BR) procedure at a Mobile Station (MS) and a Base Station (BS), and an MS apparatus and BS apparatus using the same.

DESCRIPTION OF THE RELATED ART

A receiver may detect a preamble transmitted by a specific transmitter using a preamble sequence. The receiver may use the preamble sequence for synchronization acquisition as well as channel estimation. The preamble sequence used in the preamble needs to be designed to be so long that the preamble sequence may be supported well within a large cell radius in a wireless communication system. However, the length of the preamble sequence may be limited in view of limited resources and resource allocation. Hence, these considerations should be taken into account when a BR channel is designed.

A BS needs to detect preamble sequence having various lengths and detect efficiently preamble sequence. However, for performing BR procedure, method of detecting BR preamble at the BS is not proposed yet. Also, for performing BR procedure, a method of configuring a BR channel to perform efficiently BR procedure at a MS is not studied yet.

SUMMARY

An object of the present invention devised to solve the problem lies on a method for transmitting a signal on a Bandwidth Request (BR) channel at a Mobile Station (MS).

Another object of the present invention devised to solve the problem lies on an MS apparatus for transmitting a signal via a BR channel.

Another object of the present invention devised to solve the problem lies on a method for performing a BR procedure at a Base Station (BS).

A further object of the present invention devised to solve the problem lies on a BS apparatus for performing a BR procedure.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

The object of the present invention can be achieved by providing a method for transmitting a signal on a bandwidth request channel at a mobile station in a wireless communication system, including transmitting to a base station (BS) a bandwidth request preamble and a bandwidth request message via a bandwidth request channel to request a bandwidth; and receiving from the base station a message indicating reception of the bandwidth request preamble and the bandwidth request message in response to the bandwidth request, wherein a region of the bandwidth request message is configured as null tones in a M×N tile of the bandwidth request channel, including M subcarriers on frequency axis by N Orthogonal Frequency Division Multiplexing (OFDM) symbols on time axis.

In another aspect of the present invention, provided herein is a mobile station apparatus for transmitting a signal on a bandwidth request channel in a wireless communication system, including a transmitting unit for transmitting to a base station (BS) a bandwidth request preamble and a bandwidth request message via a bandwidth request channel to request a bandwidth; and a receiving unit for receiving from the base station a message indicating reception of the bandwidth request preamble and the bandwidth request message in response to the bandwidth request, wherein a region of the bandwidth request message is configured as null tones in a M×N tile of the bandwidth request channel, including M subcarriers on frequency axis by N Orthogonal Frequency Division Multiplexing (OFDM) symbols on time axis.

In another aspect of the present invention, provided herein is a method for performing a bandwidth request procedure at a base station in a wireless communication system, including receiving from a mobile station (MS) a bandwidth request preamble and a bandwidth request message via a bandwidth request channel for a bandwidth request; and transmitting to the mobile station a message indicating reception of the bandwidth request preamble and the bandwidth request message in response to the bandwidth request, wherein a region of the bandwidth request message is configured as null tones in a M×N tile of the bandwidth request channel, including M subcarriers on frequency axis by N Orthogonal Frequency Division Multiplexing (OFDM) symbols on time axis.

In another aspect of the present invention, provided herein is a base station apparatus for performing a bandwidth request procedure in a wireless communication system, including a receiving unit for receiving from a mobile station (MS) a bandwidth request preamble and a bandwidth request message via a bandwidth request channel for a bandwidth request; and a transmitting unit for transmitting to the mobile station a message indicating reception of the bandwidth request preamble and the bandwidth request message in response to the bandwidth request, wherein a region of the bandwidth request message is configured as null tones in a M×N tile of the bandwidth request channel, including M subcarriers on frequency axis by N Orthogonal Frequency Division Multiplexing (OFDM) symbols on time axis.

In another aspect of the present invention, provided herein is a method for performing a bandwidth request procedure at a base station in a wireless communication system, including receiving a bandwidth request via a bandwidth request channel from a mobile station, measuring an interference level of the bandwidth request channel and comparing the interference level with a predetermined threshold, and determining whether a quick access message included in the bandwidth request channel is used according to the comparison.

The method may further include transmitting grant for uplink transmission to the mobile station, if it is determined that the quick access message included in the bandwidth request channel is used.

The method may further include transmitting grant for a bandwidth request header to the mobile station, if it is determined that the quick access message included in the bandwidth request channel is not used or the base station fails to decode the quick access message.

In a further aspect of the present invention, provided herein is a base station apparatus for performing a bandwidth request procedure in a wireless communication system, including a receiving unit for receiving a bandwidth request on a bandwidth request channel from a mobile station; a measurement and comparison unit for measuring an interference level of the bandwidth request channel and comparing the interference level with a predetermined threshold; and a determining unit for determining whether a quick access message included in the bandwidth request channel is used according to the comparison.

According to the method for transmitting a signal on a BR channel according to the present invention, an MS transmits a BR preamble (indicator) only or both a BR preamble and a BandWidth REQuest (BW REQ) message on a BR channel. Characteristically, null tones are filled in a region to which the BW REQ message is allocated, thus increasing the power level of the BR preamble. Therefore, the detection performance of the BR preamble can be improved.

According to the method for performing a BR procedure according to the present invention, a BS determines whether a quick access message is used or not by detecting null tones. Thus the BR procedure is efficiently performed.

In addition, since the BS measures a noise and interference level using the null tones, the detection performance of the BR preamble can be improved.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF PREFERRED EMBODIMENTS

Figure 1:
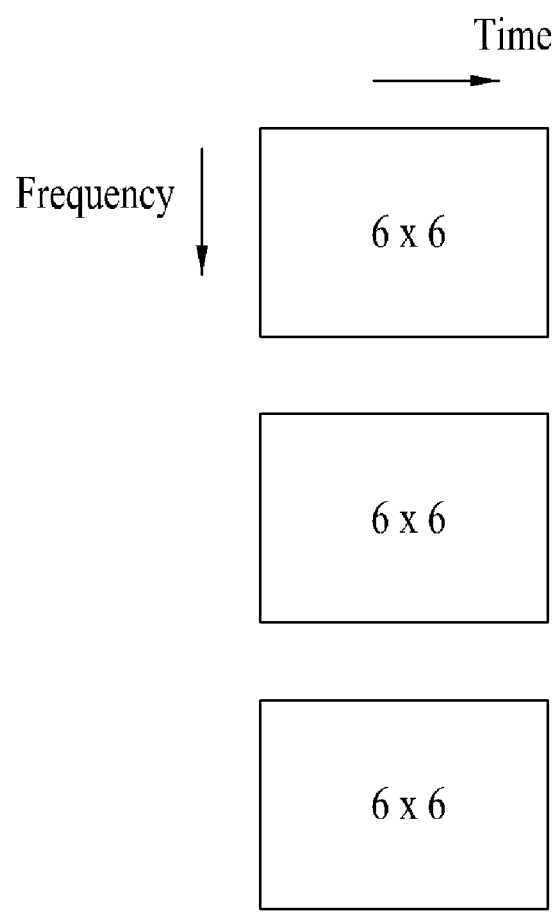
FIG. 1 illustrates a Physical Resource Unit (PRU) of a Bandwidth Request (BR) channel.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is an Institute of Electrical and Electronics Engineers (IEEE) 802.16m system. However, the description is applicable to any other mobile communication system except for features inherent to the IEEE 802.16m system.

In some instances, known structures and devices are omitted, or are shown in a block diagram form focusing on important features of the structures and devices, so as not to obscure the concept of the present invention. The same reference numbers will be used throughout this specification to refer to the same or like parts.

In the following description, 'Mobile Station (MS)' is assumed to refer to a mobile or fixed user end device such as a User Equipment (UE), an Advanced Mobile Station (AMS), etc. and 'Base Station (BS)' is assumed to refer to any node of a network end, such as a Node B, an evolved Node B (eNB or eNode B), an Advanced Base Station (ABS), an Access Point (AP), etc., communicating with the MS.

In a mobile communication system, an MS may receive information from a BS on a DownLink (DL) and transmit information to the BS on an UpLink (UL). The information transmitted from or received at the MS includes data and various control information and a variety of physical channels are defined according to the types and usages of the information.

Preambles may be categorized into a short preamble type and a long preamble type. Or three or more preamble types may be defined according to preamble lengths.

The receiver may detect a preamble blindly. The receiver wants to detect as many preambles with various lengths as possible. Preamble categories classified according to preamble lengths may be broadcast in a broadcast message (e.g. a SuperFrame Header (SFH)). After receiving the broadcast message that specifies preamble categories, the receiver may transmit a preamble using a preamble sequence with a preamble length indicated by the received broadcast message, when it needs to access the wireless communication system.

If the preamble categories are not broadcast, the transmitter may transmit a preamble with one of available preamble lengths, when the transmitter needs to access the wireless communication system. The receiver wants to detect as many preamble sequences with various preamble lengths as possible. The preamble categories may be applied to DownLink (DL) and/or UpLink (UL) control channels (a synchronization channel, a ranging channel, a BR channel, etc.) that use preambles.

Hereinafter, a brief description will be made of a BR channel among the control channels. An MS transmits BR information on a control channel in contention-based or non-contention-based random access. The BR is used to provide information about a UL bandwidth, needed for a BS. The BR channel being one of control channels has the following physical structure.

FIG. 1 illustrates a Physical Resource Unit (PRU) of the BR channel.

Referring to FIG. 1, one PRU may be of size 18×6. Specifically, one PRU includes 18 contiguous subcarriers in frequency by 6 Orthogonal Frequency Division Multiplexing (OFDM) symbols in time. One BR channel may be configured with one PRU. Alternatively, one BR channel may be extended to a group of PRUs. One PRU may be represented as one Logical Distributed Resource Unit (LDRU) in a logical domain.

Figure 2:
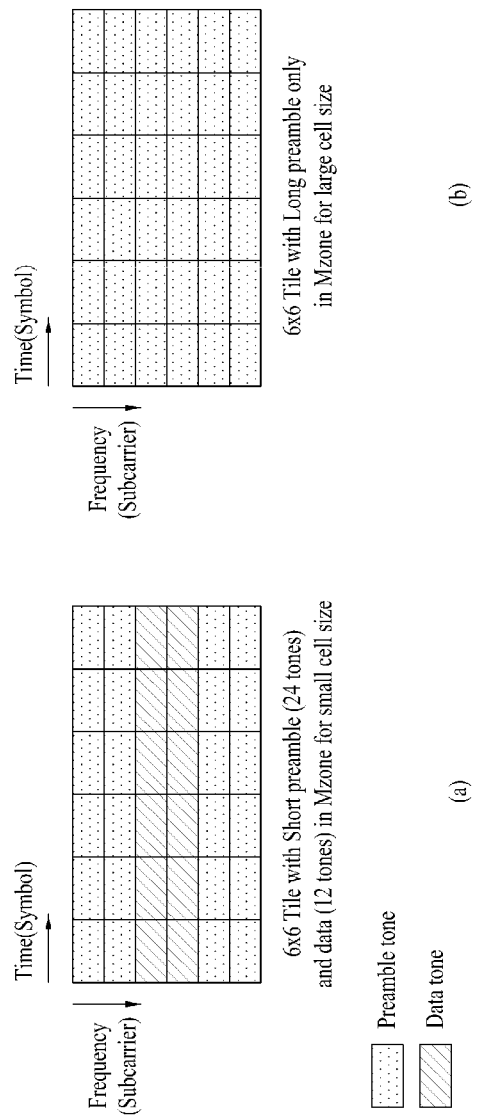
FIG. 2 illustrates exemplary structures of the BR channel.

Each BR channel may include three distributed BR tiles to achieve a frequency diversity gain. Each BR tile may be of size 6×6, that is, includes 6 contiguous subcarriers by 6 OFDM symbols. FIG. 2 illustrates exemplary structures of a Bandwidth Request (BR) channel.

Referring to FIG. 2, the BR channel includes three 6×6 tiles (BR tiles) in an Mzone, and each 6×6 tile may be configured in such a manner that the 6×6 tile carries only a preamble or both a preamble and a message (data). The Mzone refers to a region including one or more subframes in which a BS may communicate with a 16m MS in an IEEE 802.16m system. One subframe may include 6 OFDM symbols. Each BR tile may include a BW REQ message in addition to a preamble, for requesting a bandwidth, and the BW REQ message may carry data.

The positions of the BR preamble and data may vary within a BR tile. The BR channel structures illustrated in FIGS. 2(a) and 2(b) are mere exemplary applications. As illustrated in FIG. 2, the number of preamble tones and the number of data tones may be changed. For example, one 6×6 tile may include 12 preamble tones and 24 data tones, or 18 preamble tones and 18 data tones, or 24 preamble tones and 12 data tones, or 30 preamble tones and 6 data tones.

In the 6×6 tile structure illustrated in FIG. 2(a), one 6×6 tile includes 24 preamble tones and 12 data tones. The 12 data tones (i.e. data of code/sequence length 12) may be located on third and fourth subcarriers across 6 OFDM symbols in the 6×6 tile. This 6×6 tile structure is preferably applied for a small cell size. In this manner, an MS may transmit a BR preamble and a BW REQ message together to a BS in one 6×6 tile.

On the other hand, the 6×6 tile illustrated in FIG. 2(b) includes preamble tones only. Therefore, an MS may transmit the 6×6 tile allocated only a BR preamble to a BS. This long preamble sequence is preferable for a large cell size because a BR preamble needs to be transmitted at a high power level. As illustrated in FIG. 2, the numbers of preamble tones and data tones in a 6×6 tile structure vary depending on circumstances. Preambles may be categorized into short preambles and long preambles, or into three or more preamble types. Accordingly, the BS needs to signal preamble length information to the MS.

Table 1 below illustrates an exemplary format of information related to a BR that a BS transmits to an MS.

TABLE 1

| Syntax | Size (bit) | Notes |
| --- | --- | --- |
| sub-S-SFH3_message( ) { | | |
|   BR channel allocation periodicity | 2 | |
|   BR subframe allocation bitmap | TBD | |
|   BR resource start offset | 7 | |
|   BR resource frequency duration | 3 | |
|   BR preamble information | 1 | 0: short preamble length (e.g., preamble sequence length = 24)<br>1: long preamble length (e.g., preamble sequence length = 36) |
|   Initial / final backoff window size (for BR, Periodic / Initial ranging) | TBD | |
|     Ranging channel format | TBD | Ranging channel for non-synchronized AMSs |
|     Preamble information | TBD | |
|     Time/frequency allocation | TBD | |
|     Ranging channel format | TBD | Ranging channel for synchronized AMSs |
|     Preamble information | TBD | |
|     Time/frequency allocation | TBD | |
| } | | |

Referring to Table 1, when the MS request a bandwidth via a BR channel, the BS may notify the MS of the length of a BR preamble to be used according to circumstances. Specifically, the BS may signal the length of the BR preamble to the MS using a BR preamble information field. The BR preamble information field may occupy 1 bit. If the BR preamble information field is set to "0", this may indicate a short preamble sequence (e.g. preamble sequence length 24) and if the BR preamble information field is set to "1", this may indicate a long preamble sequence (e.g. preamble sequence length 36). Therefore, the MS may identify a BR preamble sequence length from the BR preamble information field received from the BS.

As described before, the MS may transmit BR request information including a BR preamble or both a BR preamble and a BW REQ message via a BR channel. That is, the MS may transmit a BR preamble and a BW REQ message carrying data for requesting a bandwidth. The BR preamble may also be referred to as a BR indicator. The BW REQ message may include information about a buffer size, a power level, Cyclic Redundancy Check (CRC) bits, etc. That is, the MS may transmit the BR preamble only, or an optional quick access message in addition to the BR preamble to the BS in order to request a bandwidth.

A BR tile may include two parts, a preamble tone part and a data tone part. For example, the MS may transmit the BR preamble on 4 subcarriers by 6 OFDM symbols in the preamble tone part, whereas MS may transmit data on 2 subcarriers by 6 OFDM symbols in the data tone part. To support a legacy mode, the BR tile may be configured as a 4×6 tile structure in which each 4×6 tile includes 4 contiguous subcarriers by six OFDM symbols. A legacy system refers to a conventional system, not limited to an IEEE 802.16e system. This 4×6 BR tile may transmit a BR preamble only.

Characteristics of a BR preamble included in a BR tile that an MS transmits to request a bandwidth will be described below. The BR preamble may be used to identify a user, a service, or the like. In addition, the BR preamble is used to indicate a BR that the MS transmits to a BS. The BR preamble may be based on Code Division Multiplexing (CDM) and BR information may be protected with a code/sequence. Any sequence is available for the BR information as far as it identifies a user. For example, the code/sequence may be an orthogonal code, a Zadoff-Chu (ZC) sequence, a family of Constant Amplitude Zero Auto-Correlation (CAZAC) sequences, etc.

The length of a BR preamble is an important factor in control channel resource allocation. If the BR preamble is long, it offers several benefits including its applicability to a large cell radius. However, in case where a BW REQ message should be transmitted in addition to the BR preamble, the length of the BR preamble needs to be adjusted. In this context, the BR preamble isain a trade-off relationship with the BW REQ message in terms of length.

The BW REQ message may be multiplexed in CDM, Frequency Division Multiplexing (FDM), Time Division Multiplexing (TDM), Space Division Multiplexing (SDM), or in a combination of two or more of CDM, FDM, TDM and SDM. The size of BW REQ message information may be expressed as the length of the BW REQ message carried on data tones. The length of the BW REQ message is also significant in control channel resource allocation.

The physical structure of a BR channel that carries a BW REQ message along with a BR preamble may be designed under some conditions. The conditions include:

The probability of wrongly determining that a signal has been received from an MS in a BS and alarming the BS of the signal reception, despite non-transmission of the signal from the MS, namely a false alarm probability should be decreased.

(2) The probability of not detecting a signal in the BS despite signal transmission from the MS, that is, a misdetection probability should be decreased.

(3) Preferably, a sufficient multiplexing capacity is ensured for a BR preamble and a BW REQ message.

(4) A sufficient channel estimation performance is needed to demodulate a BW REQ message.

(5) Preferably, the length of a BR preamble is adjusted, taking into the trade-off between the lengths of the BR preamble and the BW REQ message. These conditions need to be fulfilled to design a BR channel.

Physical structure that carries a BW REQ message together with a BR preamble will be described below.

Two types of Logical Resource Units (LRUs) are available for a BR channel in the IEEE 802.16m system, that is, a 6×6 tile-based LRU and a 4×6 tile-based LRU. Specifically, one BR tile is defined as 6 contiguous subcarriers by 6 OFDM symbols (a 6×6 tile) or as 4 contiguous subcarriers by 6 OFDM symbols (a 4×6 tile).

The two types of BR tiles are different in the number of subcarriers per BR tile. Both maximum commonality and BR channel performance need to be considered in designing these two types of BR channels.

The performance of a BR channel depends dominantly on the performance of detecting a BR preamble (or BR indicator). For detecting a BR preamble, a correlation with the BR preamble is generally compared with a predetermined threshold. Threshold setting is very important in this detection scheme. A BS may preset a threshold and compares the interference measurement of a BR channel with the threshold, the BS may determine whether a BW REQ message is used in the BR channel. The threshold may usually be set as the power level of a Noise and Interference (NI), a Carrier-to-Interference and Noise Ratio (CINR), a Signal-to-Interference and Noise Ratio (SINR), etc.

Accordingly, it is preferable to design a BR channel in such a manner that the NI power level, CINR level, or SINR level of the BR channel may be measured, in order to increase the performance of the BR channel.

As one approach to improving the performance of the BR channel, null tones may be inserted into a BR tile (e.g., 6×6 tile) to allow the NI level or the like of the BR channel to be measured. With the inserted null tones, the detection performance of a BR preamble may be increased stably. To be more specific, an MS may utilize power allocated to data for a BR preamble by replacing data with null tones in 2 subcarriers by 6 OFDM symbols. Hence, the BS may detect the BR preamble more efficiently.

For example, if the MS allocates two thirds of a total transmit power to a BR preamble on four subcarriers, it may allocate a third of the total power to data on the other two subcarriers. Meanwhile, if the MS inserts null tones in a BW REQ message region carrying data, it may allocate the total power to the BR preamble on the four subcarriers. As a consequence, the BS may detect the BR preamble efficiently and stably.

For this purpose, in case where the MS transmits to the BS a quick access message optionally in addition to the BR preamble in order to request a bandwidth, it may leave the resources of the quick access message unused and instead, it may be configured null tones in the resources.

Figure 3:
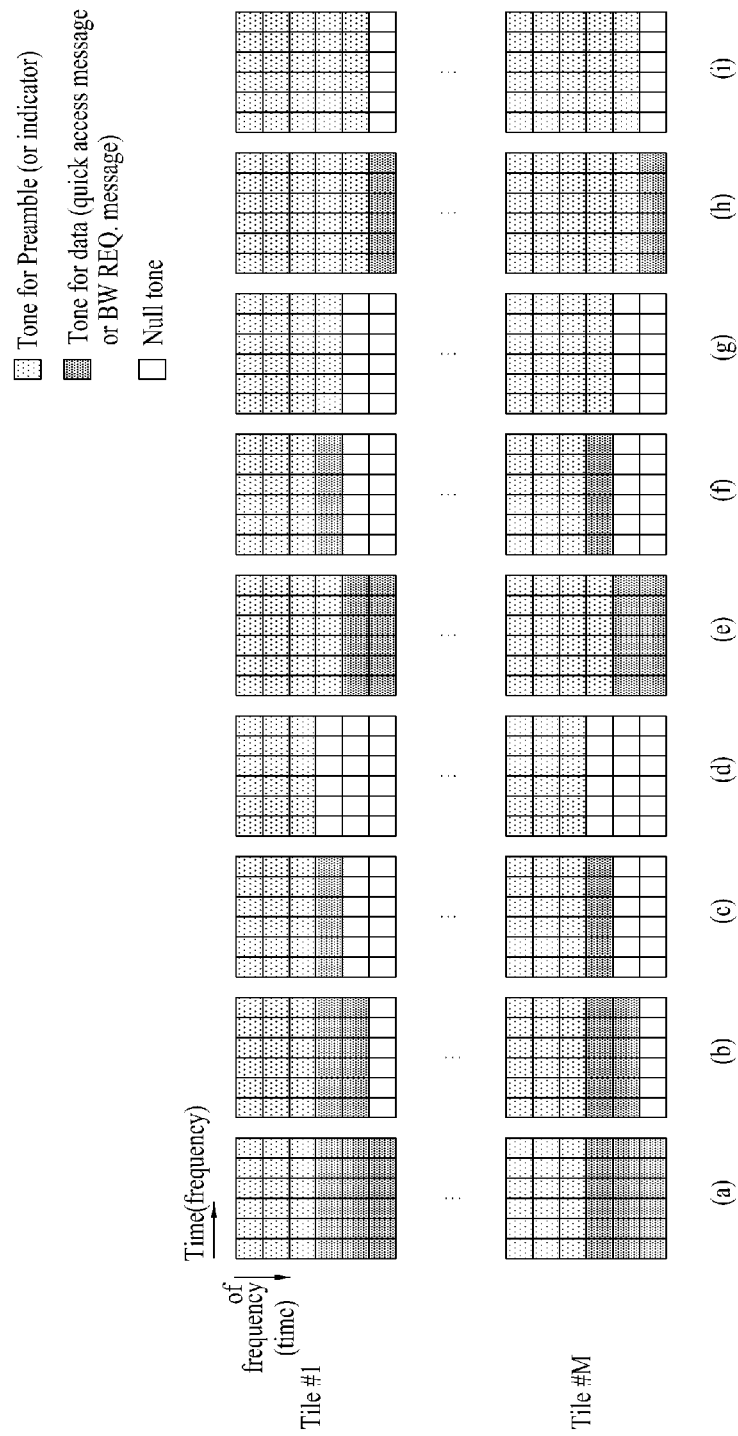
FIG. 3 illustrates 6×6 tile-based Logical Resource Units (LRUs) as BR tile structures according to exemplary embodiments of the present invention.

FIG. 3 illustrates an exemplary 6×6 tile-based LRUs as BR tile structures according to of the present invention.

Referring to FIG. 3, a 6×6 tile-based LRU includes preamble tones, data tones, and null tones. The data tones are used for a quick access message or a BW REQ message. As illustrated in FIG. 3, 9 types of 6×6 tile-based LRUs may be defined, which are mere exemplary applications.

As shown in FIGS. 3(*a*) to 3(*i*), a plurality of (M) 6×6 tiles may form a BR channel. The horizontal and vertical axes may respectively represent frequency and time or time and frequency in FIGS. 3(*a*) to 3(*i*). The following description is made with the appreciation that the horizontal axis represents time (i.e. OFDM symbols) and the vertical axis represents frequency (i.e. subcarriers) in FIGS. 3(*a*) to 3(*i*).

As illustrated in FIGS. 3(*a*) to 3(*i*), the 6×6 tile structures differ in the positions of preamble tones, data tones, and null tones. As stated before, a BR tile may be configured in a 6×6 tile structure different from the 6×6 tile structures illustrated in FIGS. 3(*a*) to 3(*i*).

Referring to FIG. 3(*a*), the BR tile includes only preamble tones and data tones. The preamble tones may be allocated to 3 contiguous subcarriers by 6 OFDM symbols, and the data tones may also be allocated to 3 contiguous subcarriers by 6 OFDM symbols. The lengths of codes/sequences for the preamble tones and the data tones are equal, 18.

Referring to FIG. 3(*b*), the BR tile includes preamble tones, data tones, and null tones. The preamble tones may be allocated to 3 contiguous subcarriers by 6 OFDM symbols (i.e. 18 preamble tones), the data tones may be allocated to 2 contiguous subcarriers by 6 OFDM symbols (i.e. 12 data tones), and the null tones may be allocated to 1 subcarrier by 6 OFDM symbols (i.e. 6 null tones).

Referring to FIG. 3(c), the BR tile includes preamble tones, data tones, and null tones. The preamble tones may be allocated to 3 contiguous subcarriers by 6 OFDM symbols (i.e. 18 preamble tones), the data tones may be allocated to 1 subcarrier by 6 OFDM symbols (i.e. 6 data tones), and the null tones may be allocated to 2 contiguous subcarriers by 6 OFDM symbols (i.e. 12 null tones).

Referring to FIG. 3(d), 18 preamble tones and 18 null tones may be used. The numbers of preamble tones and data tones may be 24 and 12, respectively as illustrated in FIG. 3(e). As illustrated in FIG. 3(f), there may be 24 preamble tones, 6 data tones, and 6 null tones. In FIG. 3(g), 24 preamble tones and 12 null tones may be used. The numbers of preamble tones and data tones may be 30 and 6, respectively as illustrated in FIG. 3(h). Referring to FIG. 3(i), 30 preamble tones and 6 null tones may be allocated.

Figure 4:
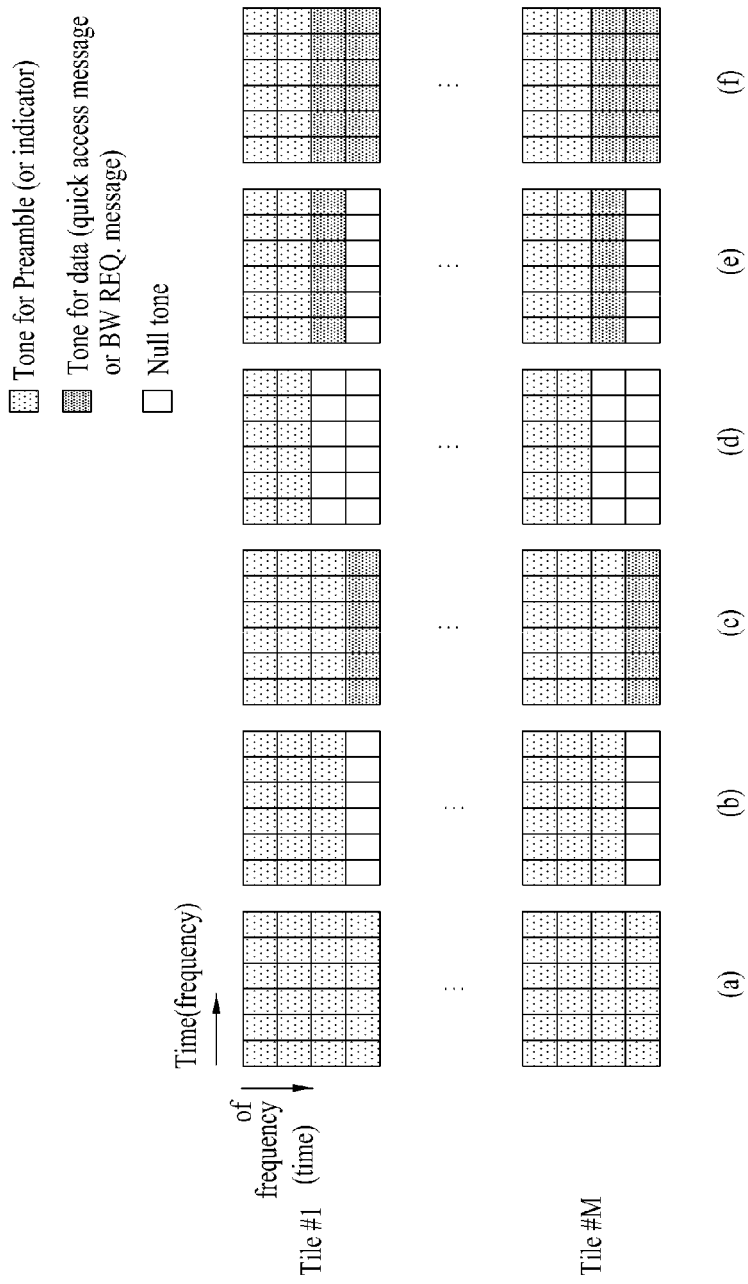
FIG. 4 illustrates 4×6 tile-based LRUs as BR tile structures according to exemplary embodiments of the present invention.

FIG. 4 illustrates an exemplary 4×6 tile-based LRUs as BR tile structures according to the present invention.

Referring to FIG. 4, a 4×6 tile-based LRU includes preamble tones, data tones, and null tones. As is with FIG. 3, the data tones are used for a quick access message or a BW REQ message. As illustrated in FIG. 4, six types of 4×6 tile-based LRUs may be defined, which are mere exemplary applications. The horizontal and vertical axes may respectively represent frequency and time or time and frequency in FIGS. 4(a) to 4(f). The following description is made with the appreciation that the horizontal axis represents time (i.e. OFDM symbols) and the vertical axis represents frequency (i.e. subcarriers) in FIGS. 4(a) to 4(f).

Referring to FIG. 4(a), the BR tile includes only preamble tones. The preamble tones may be allocated to 4 contiguous subcarriers by 6 OFDM symbols (i.e. 24 preamble tones).

Referring to FIG. 4(b), the BR tile may include 18 preamble tones and 6 null tones. Referring to FIG. 4(c), the BR tile may include 18 preamble tones and 6 data tones. Referring to FIG. 4(d), 12 preamble tones and 12 null tones may be used. The numbers of preamble tones, data tones and null tones may be 12, 6 and 6, respectively as illustrated in FIG. 4(e). As illustrated in FIG. 4(f), there may be 12 preamble tones and 12 data tones.

Novel tile structures may be created by combining the 6×6 tile-based BR tile structures illustrated in FIGS. 3(a) to 3(i) with the 4×6 tile-based BR tile structures illustrated in FIGS. 4(a) to 4(f). For instance, the tile structure illustrated in FIG. 3(a) and FIG. 4(a) may be used in combination, or the tile structure illustrated in FIG. 3(a) and FIG. 4(b) may be combined.

Figure 5:
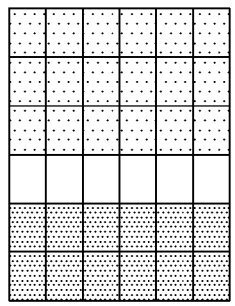
FIG. 5 illustrates 6×6 tile-based LRUs as BR tile structures according to other exemplary embodiments of the present invention.
Figure 5:
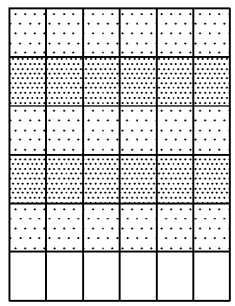
Figure 5:
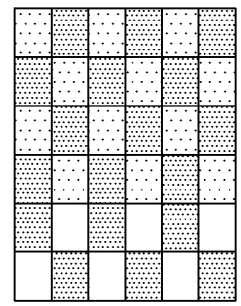
Figure 5:
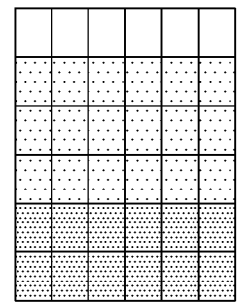

FIG. 5 illustrates other exemplary 6×6 tile-based LRUs as BR tile structures according to of the present invention.

The 6×6 tile structures illustrated in FIGS. 5(a) to 5(d) are modifications of the 6×6 tile structure illustrated in FIG. 3(b). The preamble tones, data tones and null tones illustrated in FIG. 3(b) may reside at different positions from those illustrated in FIGS. 5(a) to 5(d). The other tile structures illustrated in FIG. 3 may be modified such that the preamble tones, data tones and null tones are allocated at different positions, with the same sizes.

A procedure for requesting a bandwidth in the above-described BR tile structures will be described below.

Figure 6:
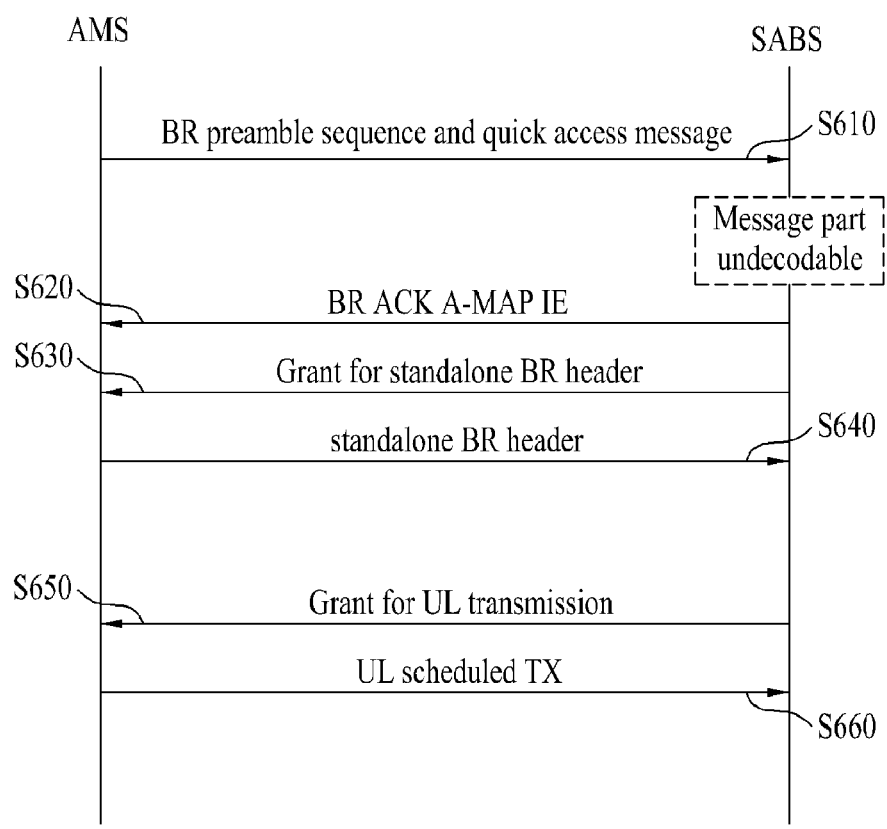
FIG. 6 is a diagram illustrating a signal flow for a BR procedure between a Mobile Station (MS) and a Base Station (BS) according to an exemplary embodiment of the present invention.

FIG. 6 is a diagram illustrating a signal flow for a BR procedure between an MS and a BS according to an exemplary embodiment of the present invention.

Referring to FIG. 6, the MS may transmit a BR preamble sequence and a quick access message to the BS in order to request a bandwidth in step S610. Upon receipt of the BR preamble sequence and the quick access message from the MS, the BS may reply to the MS with a BR ACKnowledgment Advanced-MAP Information Element (BR ACK A-MAP IE) indicating the successful reception in step S620. However, if the BS fails to decode the quick access message or if the quick access message is configured as null tones, the BS may transmit a grant for a standalone BR header to the MS in response to the BR in step S630. Then the MS transmits a standalone BR header to the BS in step S640 and the BS may transmit a grant for UL transmission to the MS in step S650. Upon receipt of the grant for UL transmission, the MS may start UL scheduled transmission to the BS in step S660.

Figure 7:
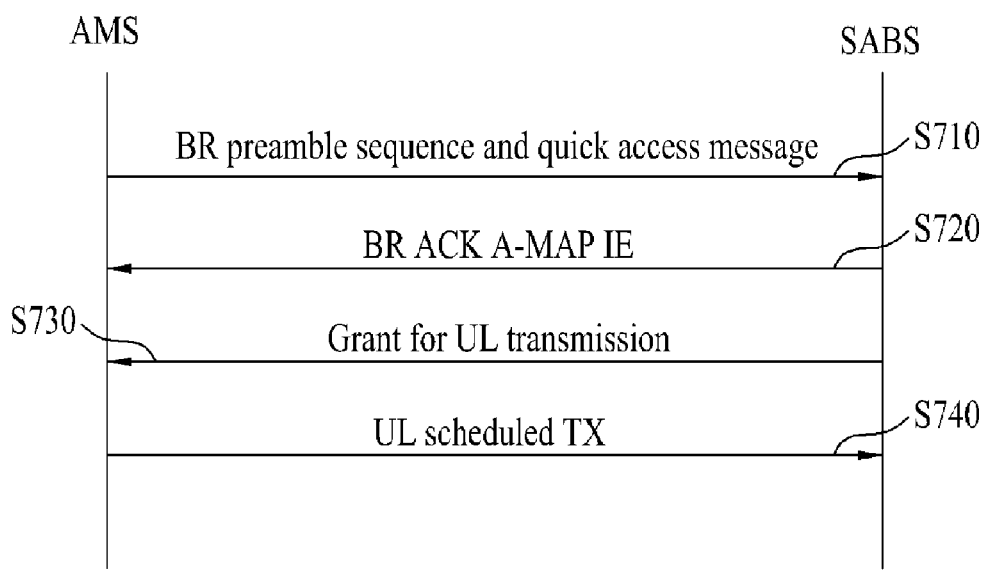
FIG. 7 is a diagram illustrating a signal flow for a BR procedure between an MS and a BS according to another exemplary embodiment of the present invention.

FIG. 7 is a diagram illustrating a signal flow for a BR procedure between an MS and a BS according to another exemplary embodiment of the present invention.

Referring to FIG. 7, the MS may transmit a BR preamble sequence and a quick access message to the BS in order to request a bandwidth in step S710. Upon receipt of the BR preamble sequence and the quick access message from the MS, the BS may reply to the MS with a BR ACK A-MAP IE indicating the successful reception in step S720. Then the BS may transmit a UL grant to the MS by a BR ACK A-MAP IE or a Code Division Multiple Access (CDMA) allocation A-MAP IE in step S730. Upon receipt of the UL grant, the MS may start UL scheduled transmission to the BS in step S740.

However, if the BS fails to decode the quick access message or if the quick access message is filled with null tones, the BS transmits a grant for a BR header to the MS as in step S630, instead of transmitting the UL grant to the MS. Then the MS returns to steps S640, S650 and S660 in a fallback procedure.

MS apparatus and a BS apparatus that perform a BR procedure according to the present invention will be described.

Figure 8:
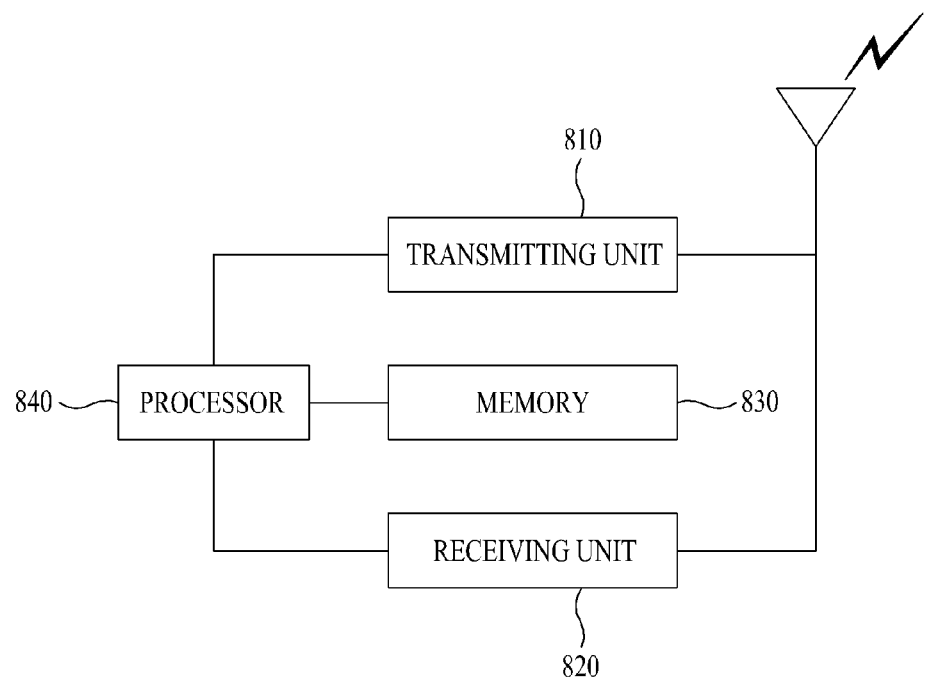
FIG. 8 is a block diagram of an MS apparatus for transmitting a signal on a BR channel according to an exemplary embodiment of the present invention.

FIG. 8 is a block diagram of an MS apparatus for transmitting a signal on a BR channel according to an exemplary embodiment of the present invention.

Referring to FIG. 8, the MS apparatus may include a transmitting unit 810, a receiving unit 820, a memory 830, and a processor 840.

The transmitting unit 810 may transmit a BR preamble and a BW REQ message together on a BR channel to a BS to request a bandwidth. More specifically, the MS apparatus may allocate null tones to a region allocated for BW REQ message in a 6×6 tile of the BR channel, defined as 6 subcarriers by 6 OFDM symbols.

The receiving unit 820 may receive an ACK message indicating reception of the BR in response to the BR.

The memory 830 may store externally received information and data, and data processed by the MS apparatus for a predetermined time. A buffer (not shown) may substitute for the memory 830.

Figure 9:
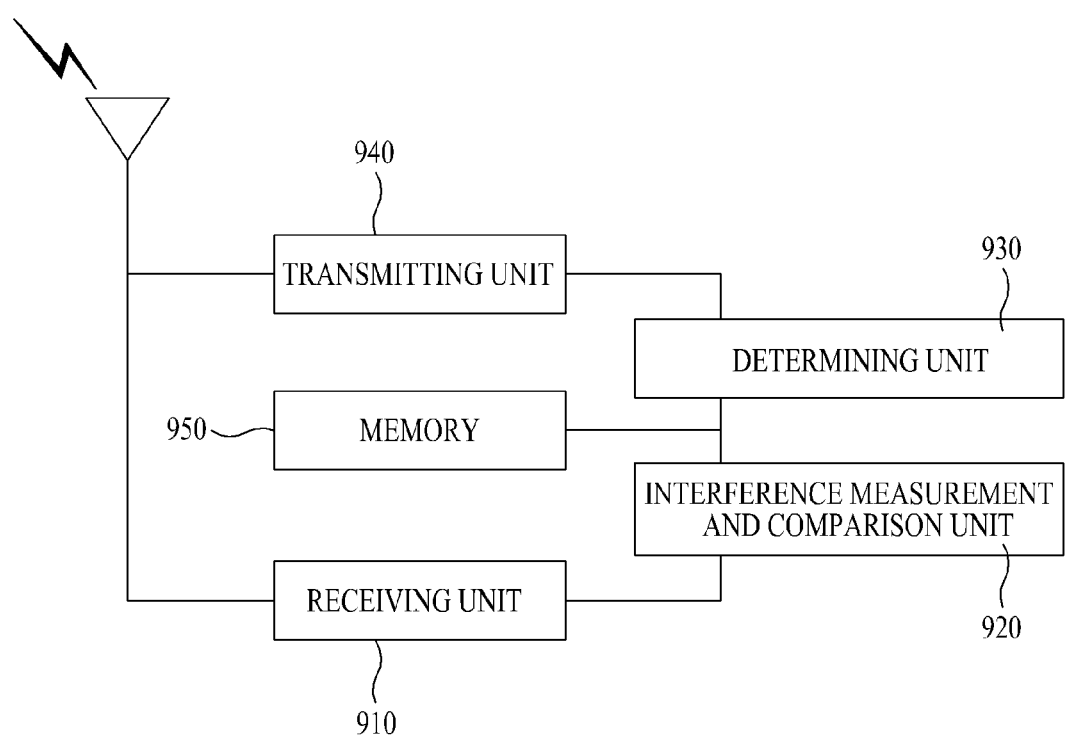
FIG. 9 is a block diagram of a BS apparatus for performing a BR procedure according to an exemplary embodiment of the present invention.

FIG. 9 is an exemplary block diagram of a BS apparatus for performing a BR procedure according to the present invention.

Referring to FIG. 9, the BS apparatus may include a receiving unit 910, an interference measurement and comparison unit 920, a determining unit 930, and a transmitting unit 940.

The receiving unit 910 may receive a BR on a BR channel from an MS. Specifically, the receiving unit 910 may receive a BR preamble and a BW REQ message on the BR channel from the MS. Null tones may be located in a region allocated to the BW REQ message in a 6×6 tile defined as 6 subcarriers by 6 OFDM symbols in the BR channel.

The interference measurement and comparison unit 920 may measure the interference level of the BR channel and compare the interference level with a predetermined threshold. The determining unit 930 may determine whether the quick access message included in the BR channel is used or not based on the comparison result.

If the determining unit 930 determines that the quick access message is used, the transmitter 940 may transmit a grant for UL transmission to the MS. Then the receiving unit 910 may receive UL scheduled data from the MS. In addition, the transmitting unit 940 may transmit an ACK message indicating reception of the BR in response to the BR to the MS. This transmitting unit 940 may transmit various signals, data and information to the MS.

On the other hand, if the determining unit 930 determines that the quick access message is not used or if the quick access message is not decodable, the transmitting unit 940 may transmit a grant for a BR header to the MS. Subsequently, the BS apparatus may steps S640, S650 and S660 described in FIG. 6.

The memory 950 may store externally received information and data, and data processed by the BS apparatus for a predetermined time. A buffer (not shown) may substitute for the memory 830.

Various embodiments have been described in the best mode for carrying out the invention.

A method for transmitting a signal via a BR channel at an MS, an MS apparatus using the same, a method for performing a BR procedure at a BS, and a BS apparatus using the same according to the exemplary embodiments of the present invention are applicable to a Long Term Evolution (LTE) system, an IEEE 802.16m system, and other systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

That is, it will be understood that this patent should not be limited to the specific embodiments described herein, but be accorded a right to the broadest scope consistent with the principles and novel features disclosed herein.

The invention claimed is:

1. A method for transmitting a signal via a bandwidth request (BR) channel at a mobile station (MS) in a wireless communication system, the method comprising:
    transmitting a BR preamble via the BR channel,
    wherein the BR channel includes a region of a BR preamble sequence and null tones,
    wherein the null tones span two contiguous subcarriers by six symbols, and
    wherein the region of the BR preamble sequence spans four subcarriers by six symbols.

2. The method of claim 1, wherein the BR channel includes three BR tiles each of which spans six contiguous subcarriers by six symbols.

3. The method of claim 1, further comprising:
    receiving information indicating a BR preamble sequence length.

4. The method of claim 3, wherein the BR preamble sequence length is 24 or 36.

5. A mobile station (MS) for transmitting a signal via a bandwidth request (BR) channel in a wireless communication system, the MS comprising:
    a transmitting unit for transmitting a BR preamble via the BR channel,
    wherein the BR channel includes a region of a BR preamble sequence and null tones,
    wherein null tones span two contiguous subcarriers by six symbols, and
    wherein the region of the BR preamble sequence spans four subcarriers by six symbols.

6. A method for performing a bandwidth request (BR) procedure at a base station (BS) in a wireless communication system, the method comprising:
    receiving a BR preamble via the BR channel,
    wherein the BR channel includes a region of a BR preamble sequence and null tones,
    wherein the null tones span two contiguous subcarriers by six symbols, and
    wherein the region of the BR preamble sequence spans four subcarriers by six symbols.

7. The method of claim 6, wherein the BR channel includes three BR tiles each of spans six contiguous subcarriers by six symbols.

8. A base station (BS) for receiving a bandwidth request (BR) channel in a wireless communication system, the BS comprising:
    a receiving unit for receiving a BR preamble via the BR channel,
    wherein the BR channel includes a region of a BR preamble sequence and null tones,
    wherein the null tones span two contiguous subcarriers by six symbols, and
    wherein the region of the BR preamble sequence spans four subcarriers by six symbols.

* * * * *